Jan. 16, 1934.   W. H. DELAHAYE   1,943,816
AUTOMATIC ADJUSTING DEVICE FOR BRAKES

Filed Aug. 14, 1931

INVENTOR:
WALTER H. DELAHAYE.

BY   ATTORNEY

Patented Jan. 16, 1934

1,943,816

UNITED STATES PATENT OFFICE 1,943,816

AUTOMATIC ADJUSTING DEVICE FOR BRAKES

Walter H. Delahaye, Ottawa, Ontario, Canada, assignor to Bendix Brake Company, South Bend, Ind., a corporation of Illinois Application August 14, 1931. Serial No. 557,022

3 Claims. (Cl. 188—79.5)

The invention relates to means for automatically adjusting the shoes with respect to the drum in automobile brakes to compensate for wear of the brake lining.

The object of the invention is to provide an improved adjusting device which is of simple construction and reliable in operation.

According to the present invention, the adjusting mechanism constitutes part of a toggle device for applying the brake. Preferably the toggle members are designed to have a considerable movement in applying and releasing the brake, so that the automatic adjustment is effected, when necessary, in a positive manner and the adjustment need not be as accurately effected as would be necessary if the brake clearance and toggle movement were small.

The invention consists in the construction, combination and arrangement of parts hereinafter described and more particularly pointed out in the appended claims.

Referring now to the accompanying drawing which illustrates, by way of example, two convenient embodiments of the invention:

The invention is illustrated as applied to a brake comprising the usual rotatable drum 1, stationary disc 2, and a pair of shoes 3 and 4, which may be pivotally mounted in any convenient manner.

Figure 1:
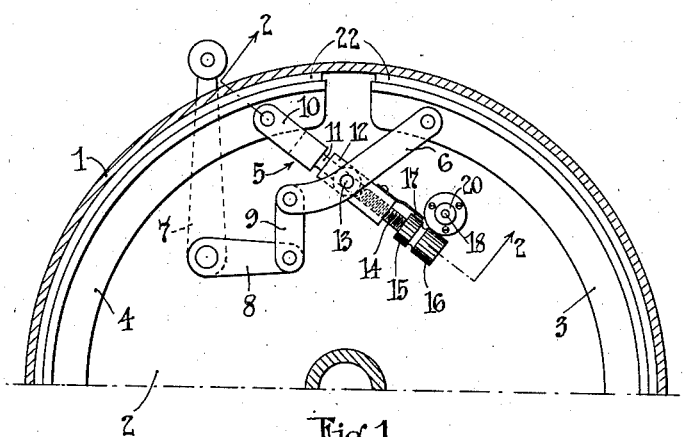
Figure 1 is a fragmentary elevation of one form of the invention.
Figure 2:
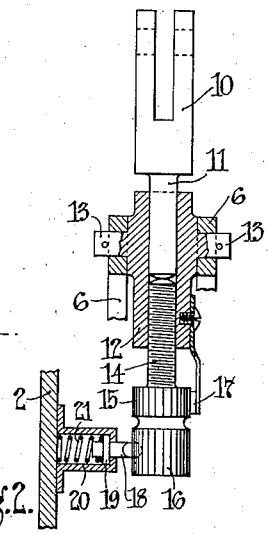
Figure 2 is an enlarged section substantially on the line 2—2 of Figure 1.

In Figures 1 and 2 the automatically adjustable applying means are as follows: A toggle 5, 6 is arranged to be straightened to apply the shoes, or collapsed to release the shoes, by any suitable mechanism such as a lever 7, arm 8 and link 9. The toggle member 5 comprises a fork 10, pivoted to the shoe 4 and provided with a stem 11 slidably mounted in a screw-threaded bore in a sleeve 12. The sleeve 12 is provided with trunnions 13 on which the toggle levers 6 are pivotally mounted between their ends. A screw 14 is screwed into the lower end of the bore in the sleeve 12 which is formed with a serrated member 15 and a ratchet 16. A spring-pressed pawl 17 is mounted on the sleeve 12 and engages the serrated member 15 to maintain the screw 14 yieldingly in adjusted position with respect to the sleeve 12.

A spring-pressed plunger 18 is mounted on the stationary disc 2 in the path of movement of the ratchet 16. The plunger is provided with a collar or other stop 19 which is normally pressed against the outer end of a casing 20 by a compression spring 21.

The plunger 18 is so situated with respect to the ratchet 16 that the latter will not engage the plunger until the lining 22 on the shoes 3 and 4 becomes worn beyond a predetermined amount. As the lining wears thinner the movement of the toggle parts 5, 6 required to apply the brake shoes becomes greater, and after a predetermined amount of wear has occurred the ratchet will ride over the inclined end of the plunger 18 when the brake is applied without causing rotation of the screw 14. The teeth of the ratchet 16 and the inclination of the end of the plunger 18 are such that on the releasing movement of the toggle, the plunger 18 will not be depressed, so that the ratchet 16 and screw 14 will be rotated a fraction of a revolution. The direction of this partial rotation is such that the screw 14 will be screwed further into the sleeve 12, and as the end of the stem 11 rests against the screw 14, the stem 11 will be moved out of the sleeve 12 a corresponding amount. The pawl 17 yields to permit this automatic adjustment, but engages the serrations 15 with sufficient firmness to prevent any accidental rotation of the screw 14. The clearance between the friction material 22 and the drum 1 will thus be automatically maintained constant within predetermined limits, regardless of decreasing thickness of the brake lining.

Figure 3:
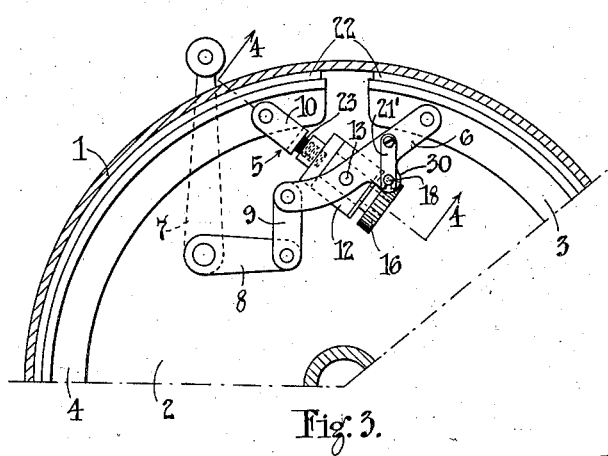
Figures 3 and 4 are views similar to Figures 1 and 2 illustrating a modified form of the invention.
Figure 4:
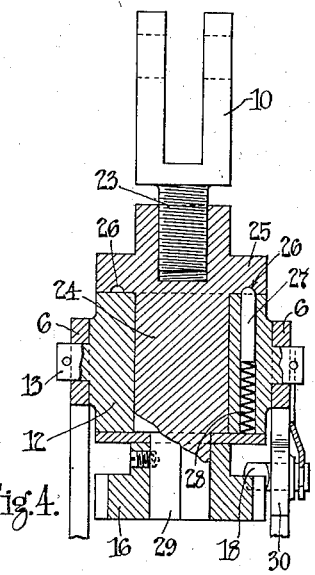

In Figures 3 and 4, the toggle member 10 is provided with a screw-threaded stem 23 engaging a threaded bore in a cylindrical member 24. The member 24 is formed with a flange 25 provided with a series of semi-spherical recesses 26 in its face which engages the sleeve 12. The sleeve 12 is bored to receive a plunger 27 coacting with the recesses 26 and pressed towards the flange 25 by a spring 28. The member 24 is formed with a projection 29 on which the ratchet 16 is secured. In this form of the invention the plunger 18 is mounted in a bored lug 30 on one of the toggle levers 6. The spring 21' may be in the form of a leaf spring attached at one end to the lever 6 and at the other end engaging the plunger 18. The operation of this device will be clear without further description. The spring-pressed plunger 27 is of course analogous to the pawl 17 and performs the same functions.

The foregoing description and accompanying drawing are given by way of example only and further modifications may be made within the scope of the appended claims without departing from the invention.

I claim:

1. A brake comprising friction means having an applying toggle which includes a link having two members adjustably threaded together and one of which is held from turning, a ratchet having teeth and connected to the part which is free to turn, means yieldingly resisting the turning of the ratchet, and a yieldingly-mounted pawl plunger slidably mounted to engage the ratchet at the end of a predetermined applying movement of the toggle, and to slip over the next tooth of the ratchet without turning the ratchet upon further applying movement of the toggle due to wear of the brake, said plunger acting upon the release of the brake to turn the ratchet by one tooth.

2. A brake comprising friction means having an applying toggle which includes two links one having two members adjustably threaded together and one of which is held from turning, a ratchet having teeth and connected to the part which is free to turn, means yieldingly resisting the turning of the ratchet, and a yieldingly-mounted pawl plunger slidably mounted in the other toggle link to engage the ratchet at the end of a predetermined applying movement of the toggle and to slip over the next tooth of the ratchet without turning the ratchet upon further applying movement of the toggle due to wear of the brake, said plunger acting upon the release of the brake to turn the ratchet by one tooth.

3. A brake-actuating toggle link comprising an internally-threaded sleeve, a fork adapted to be pivoted at its outer end to a brake shoe and having at its inner end an unthreaded stem extending into the sleeve, an adjusting member threaded into the opposite end of the sleeve and abutting against the end of said stem, and means for turning the adjusting member to lengthen said link.

WALTER H. DELAHAYE.